United States Patent
Moore, Jr. et al.

(10) Patent No.: US 9,750,039 B2
(45) Date of Patent: Aug. 29, 2017

(54) CONFIGURABLE WIRELESS SWITCHED NETWORK

(71) Applicant: International Business Machines Corporation, Armonk, NY (US)

(72) Inventors: John E. Moore, Jr., Brownsburg, IN (US); Jeffrey K. Price, Austin, TX (US); Robert R. Wentworth, Round Rock, TX (US); Stanley C. Wood, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 532 days.

(21) Appl. No.: 14/196,327

(22) Filed: Mar. 4, 2014

(65) Prior Publication Data

US 2015/0257040 A1    Sep. 10, 2015

(51) Int. Cl.
*H04W 72/10* (2009.01)
*H04W 28/20* (2009.01)
(Continued)

(52) U.S. Cl.
CPC ......... *H04W 72/10* (2013.01); *H04L 43/0876* (2013.01); *H04W 28/20* (2013.01);
(Continued)

(58) Field of Classification Search
CPC ............ H04W 28/0231–28/0236; H04W 28/0252–28/0263; H04W 28/08–28/085;
(Continued)

(56) References Cited

U.S. PATENT DOCUMENTS 7,639,656 B2   12/2009 Dooley et al.
2004/0081144 A1   4/2004 Martin et al.
(Continued)

FOREIGN PATENT DOCUMENTS

WO    2004027628 A1    4/2004

OTHER PUBLICATIONS

Japanese Application JP2002057714 (A), published Feb. 22, 2002, abstract only, 2 pages.
(Continued)

*Primary Examiner* — Eric Myers
(74) *Attorney, Agent, or Firm* — Cantor Colburn LLP; Kurt Goudy

(57) ABSTRACT

A configurable wireless switched network includes a wireless access point. The wireless access point includes an application that is executable thereon. The application is configured to set, by a user via an input component, a first port of a plurality of ports as a command channel. The command channel provides a first point of contact between the wireless access point and client devices. The application is also configured to receive configuration parameters from the user. The configuration parameters include port allocation instructions for the ports and identifiers of the client devices. The application is further configured to monitor bandwidth utilization on a network; receive, at the command channel, a request from one of the client devices to access the network; and assign one of the ports to the client device based on the port allocation instructions, the bandwidth utilization, and an identifier of the client device.

20 Claims, 2 Drawing Sheets

(51) Int. Cl.
*H04W 72/04* (2009.01)
*H04W 88/08* (2009.01)
*H04W 88/10* (2009.01)
*H04L 12/26* (2006.01)

(52) U.S. Cl.
CPC .......... *H04W 72/048* (2013.01); *H04W 88/08* (2013.01); *H04W 88/10* (2013.01)

(58) Field of Classification Search
CPC . H04W 28/20; H04W 72/04; H04W 72/0453; H04W 72/0486–72/0493; H04W 72/1205; H04W 72/1226–72/1236; H04W 72/1252–72/1257
See application file for complete search history.

(56) References Cited

U.S. PATENT DOCUMENTS

| | | |
|---|---|---|
| 2005/0059396 A1 | 3/2005 | Chuah et al. |
| 2005/0124359 A1 | 6/2005 | Willins et al. |
| 2006/0062171 A1* | 3/2006 | Baiamonte .......... H04L 12/5693 370/328 |
| 2006/0274774 A1 | 12/2006 | Srinivasan et al. |
| 2007/0060158 A1 | 3/2007 | Medepalli et al. |
| 2009/0180430 A1 | 7/2009 | Fadell |
| 2010/0142465 A1 | 6/2010 | Medepalli et al. |
| 2011/0280194 A1 | 11/2011 | Schmidt et al. |
| 2012/0257634 A1 | 10/2012 | Martillo et al. |
| 2012/0297229 A1* | 11/2012 | Desai .................. H04W 76/023 713/340 |

OTHER PUBLICATIONS

Athanasiou, George et al., "Efficient Load-Aware Channel Allocation in Wireless Access Networks", Journal of Computer Networks and Communications, 2011 article ID 972051, 14 pages.
Cisco.com, "Cisco Wireless Mesh Access Points, Design and Deployment Guide, Release 7.0", http://www.cisco.com/c/en/us/td/docs/wireless/technology/mesh/7-0/design/guide/MeshAP_70.html, last revised Jun. 3, 2013, 108 pages.
Koutsopoulos, Iordanis, "Joint Optimal Access Point Selection and Channel Assignment in Wireless Networks", IEEE/ACM Transactions on Networking, vol. 15, No. 3, Jun. 2007; pp. 521-532.
Sun, Jun et al., "Wireless Channel Allocation Using an Auction Algorithm", IEEE Journal on Selected Areas in Communications, vol. 24, No. 5, May 2006; pp. 1085-1096.
Weiss, Timo et al., "Efficient signaling of Spectral Resources in Spectrum PoolingSsystems", SCVT 2003; 6 pages.
"Wireless LAN Virtualization: Twice the network at half the cost.", White Paper, MERU Networks, http://www.merunetworks.com/collateral/white-papers/2012-wp-wireless-lan-virtualization-twice-the-network-at-half-the-cost.pdf.pdf, 2012, 7 pages.

* cited by examiner

CONFIGURABLE WIRELESS SWITCHED NETWORK

BACKGROUND

The present invention relates to wireless networks, and more specifically, to a configurable wireless switched network.

Wireless routers, also referred to as wireless access points and switches, are very often used in networking configurations, such as local area networks. Wireless routers, may be single- or dual-band capable, and may support a number of wired connections through its ports (also referred to as channels). Wireless routers typically use one channel (or two in the case of a dual-band router) to share all wireless access to the router.

In a home environment, at one time there may be heavy streaming of content to devices that require large amounts of bandwidth and at another time there may be very little bandwidth consumption among the devices. Thus, the bandwidth utilization at any given time can vary significantly with respect to network devices.

SUMMARY

According to embodiments of the present invention, a configurable wireless switched network includes a wireless access point. The wireless access point includes a plurality of ports; an input component; a memory unit; a computer processor communicatively coupled to the plurality of ports, the input component, and the memory unit; and an application. The application is operable to set, by a user via the input component, a first port of the plurality of ports as a command channel. The command channel provides a first point of contact between the wireless access point and client devices communicatively supported over a network by the wireless access point. The application is also configurable to receive configuration parameters from the user. The configuration parameters include port allocation instructions for the plurality of ports and identifiers of the client devices. The port allocation instructions and the identifiers are stored in the memory unit. The application is further operable to monitor bandwidth utilization on the network; receive, at the command channel, a request from one of the client devices to access the network; retrieve the port allocation instructions; and assign one of the plurality of ports to the client device based on the port allocation instructions, the bandwidth utilization, and an identifier of the one of the client devices.

Additional features and advantages are realized through the techniques of the present invention. Other embodiments of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, a configurable wireless switched network is provided. Wireless switched networking processes enable a wireless access point (WAP) or router to act as a multi-mode switched/shared device using channels as set ports. The wireless switched networking processes enable an end user or administrator to configure channels on their wireless router to act as switched ports by chaining specific devices to set channels, or by setting the channels aside for the router to automatically negotiate a unique channel for an individual client to use as a port. In addition, the wireless switched networking processes allow for any individual channel to be set up (or set aside) for implementation in normal, 'shared' mode, thus allowing for the end user to set up certain classes of clients to share a port, while servers needing increased bandwidth, such as home media or file servers, can attach to their own individual ports.

Figure 1:
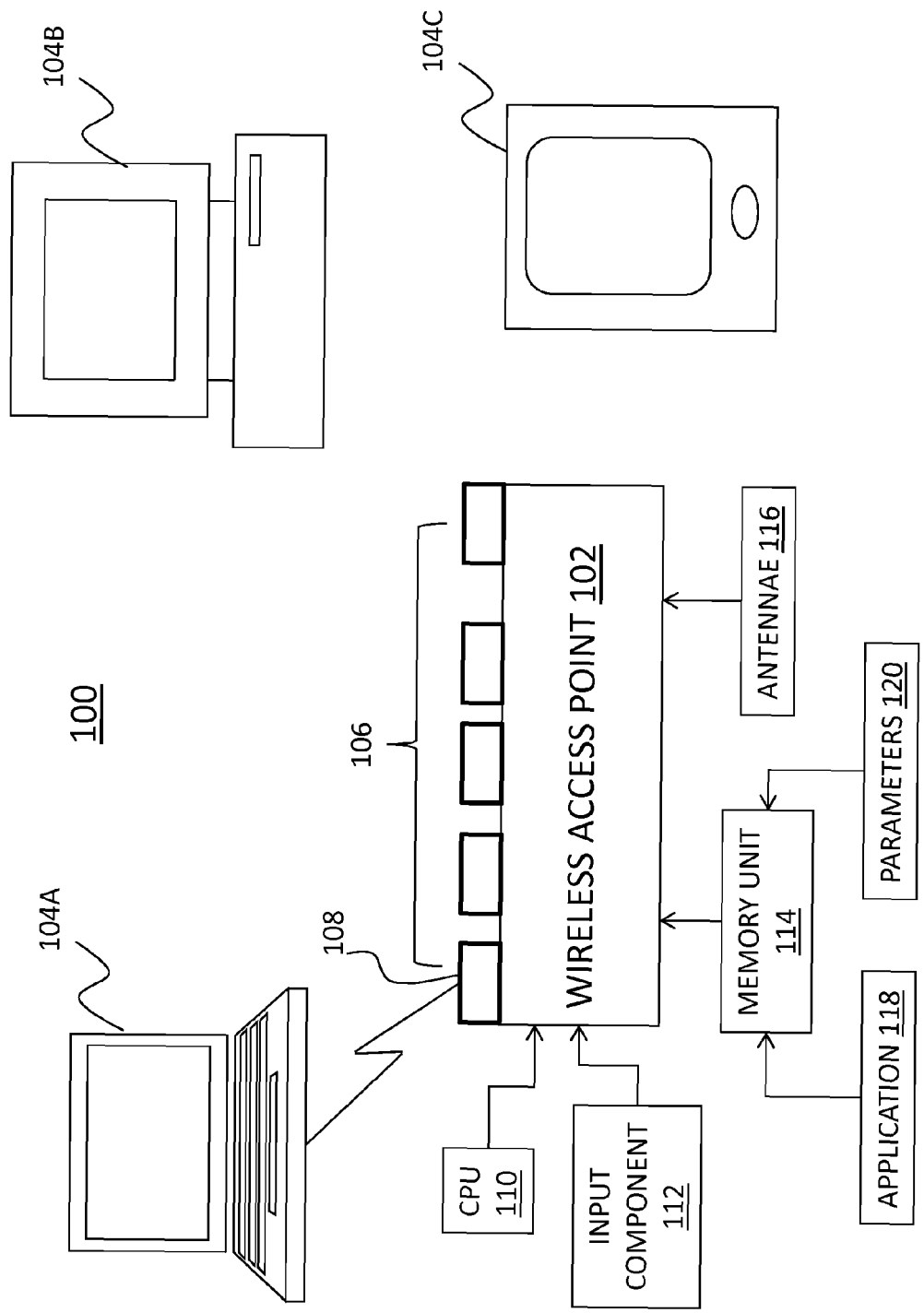
FIG. 1 depicts a system upon which wireless switched networking may be implemented in accordance with some embodiments.

Turning now to FIG. 1, a system upon which wireless switched networking may be implemented will now be described in accordance with some embodiments.

The system 100 includes a wireless access point (WAP) 102 and client devices 104A, 104B, and 104C (collectively referred to as "104"), which together form part of a network, such as a local area network.

The WAP 102 includes ports (also referred to as channels) 106. One of the ports is designated as a command channel 108, as will be described further herein. The ports 106 enable network access for the client devices 104A, 104B, and 104C.

The client devices 104 may be implemented as any type of communication device with processing and network communication capabilities. As shown in FIG. 1, for example, client device 104A is a laptop, client device 104B is a desktop or general-purpose computer, and client device 104C is a portable device, such as a tablet PC or smart phone. The client devices 104 may be any combination of wired and/or wireless communication devices. In one embodiment, at least one of the client devices 104 is connected to the WAP 102 via physical wiring, and at least one of the client devices 104 is wirelessly connected to the WAP. In an embodiment, the client devices 104 may operate logic embedded on corresponding network device drivers (not shown) to facilitate configuration of the ports 106.

The WAP 102 includes a computer processor (CPU) 110, an input component 112, a memory unit 114, and at least one antenna 116. The input component 112 may be implemented as one or more physical buttons, knobs, or switches. A user, such as an operator of any of the client devices 104 may configure the ports 106 via the input component 112. In one embodiment, at least a portion of the configuration of the ports may be implemented via the client devices 104 (e.g., through the logic embedded on the network device drivers).

The antennae 116 may be implemented to conform to current wireless communication standards, e.g., IEEE 802.11. The memory unit 114 may store an application 118 and parameters 120 for use in implementing the exemplary wireless switched networking processes described herein. The computer processor 110 executes the application 118 to receive parameters from a user of the network and to assign ports to client devices 104, as will be described further herein.

The parameters 120 include allocation instructions selected or created by the user. The parameters 120 may be non-negotiable, such that an assignment of a client device to a port is carried out regardless of other conditions or activities experienced on the network. In this embodiment, the assignment may be directed to a shared port or an individual port. For example, a parameter 120 may be a dedicated port assigned to a particular client device 104. Likewise, a parameter 120 may be a shared port that is assigned for two or more client devices 104. The port may be assigned based on a client device identifier that is determined by the application 118 when the client device attempts to gain access to the network.

Alternatively, or in addition, thereto, the parameters 120 may include negotiable elements, such that an assignment of a client device to a current port is renegotiated based on various conditions, such as identification of a peak throughput pattern of bandwidth utilization or a threshold value of bandwidth utilization set via the parameters. In this embodiment, when a specified condition is met, the renegotiation may result in reassignment of the client device from its current port to a different port on the WAP 102. To illustrate further, the following scenarios are provided:

Example A describes dynamic renegotiation of a client device into an individual (non-shared) port. In this example, the client device surpasses a clip level (threshold bandwidth) utilization, and the application 118 negotiates with the client device 104 to move the client device's connection over to an individual port. The connection is moved, and the client device 104 is now on a switched individual port.

Example B describes a client device configured for direct attachment to an individual port of the WAP 102. In this example, a user (e.g., administrator) configures the WAP 102 to always supply an individual (non-shared) port to a specified client device. The client device attaches to the WAP 102 through the command channel 108. The WAP 102 negotiates with the client device to move the client device's connection over to an individual (non-shared) port. The connection is moved, and the client device is now on a switched individual port.

Example C describes dynamic renegotiation of a client device into a shared pool port. In this example, the client device, which was previously dynamically attached to an individual port, hits a fallback clip level (i.e., bandwidth utilization decreases). The WAP 102 negotiates with the client device to move the client device's connection over to a shared port. The connection is moved, and the client device is now on a port that is part of a shared pool.

Figure 2:
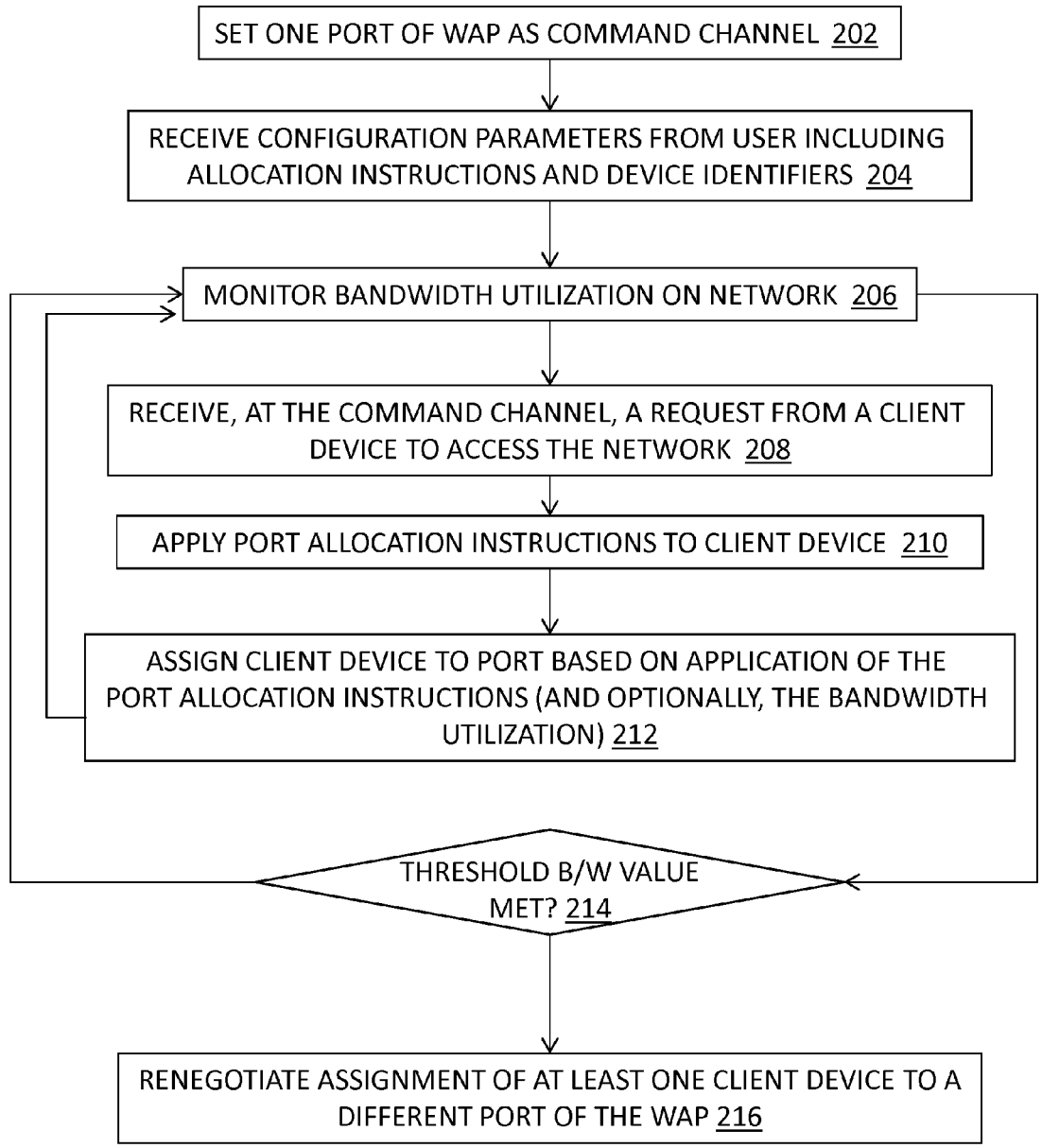
FIG. 2 depicts a flow diagram illustrating a process for implementing wireless switched networking in accordance with some embodiments.

Turning now to FIG. 2, an exemplary process for implementing the configurable wireless switched networking will now be described.

At block 202, at set up process begins. A user sets one port of the WAP 102 as the command channel 108. As indicated above, the command channel provides a first point of contact between the WAP 102 and client devices communicatively supported over a network by the WAP 102.

At block 204, the application 118 receives configuration parameters 120 from the user. The configuration parameters 120 include port allocation instructions for the ports 106 and may also include identifiers of the client devices. The port allocation instructions and the identifiers may be stored in the memory unit 114.

At block 206, the application 118 monitors bandwidth utilization of the network. At this point, the process of FIG. 2 includes two separate branches, which may or may not be simultaneously implemented. One of the paths is directed to handling a request from a client device looking to access the network, while the other path is directed to dynamic renegotiation of assignments based on results of the network monitoring. The first path is described in blocks 208-212, and the second path is described in blocks 214 and 216.

At block 208, the command channel 108 receives a request from a client device 104 to access the network. At block 210, the application applies port allocation instructions to the client device. For example, if the port allocation instructions provide that a particular client device use a dedicated port, then the application 118 follows the port allocation instructions accordingly. Thus, at block 212, the client device is assigned to a port based on the application of the port allocations instructions. In one embodiment, the assignment may further consider the bandwidth utilization information resulting from the monitoring in performing the assignment, if desired. The process returns to block 206.

Returning to the second path of FIG. 2, the application 118 determines if a threshold bandwidth utilization level has been met. For example, the configuration parameters 120 may include a maximum threshold utilization pattern, which when detected from the network monitoring over time, causes the application 118 to dynamically renegotiate assignment of at least one of the client devices to a dedicated port. Likewise, the configuration parameters 120 may include a minimum threshold bandwidth utilization pattern, which when detected from the network monitoring over time, causes the application 118 to dynamically renegotiate assignment of the client device to a shared port. The reassignment may be implemented immediately (e.g., on determination that the client device is outside of the threshold utilization value) or may be implemented upon reconnection of the client device to the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those or ordinary skill in the art without department from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for a wireless access point in a local area network, comprising:
   the wireless access point for a home comprising;
   a plurality of ports;
   an input component, the input component is selected from a group consisting of one or more buttons, knobs, and switches;
   a memory unit;
   a computer processor communicatively coupled to the plurality of ports, the input component, and the memory unit; and
   an application executable by the computer processor of the wireless point, the application operable to:
   set, by a user of the wireless access point, a first port of the plurality of ports as a command channel, the command channel providing a first point of contact between the wireless access point and client devices communicatively supported over the local area network by the wireless access point;
   receive, by the wireless access point, configuration parameters from the user, the configuration parameters including port allocation instructions for the plurality of ports and identifiers of the client devices, the port allocation instructions and the identifiers stored in the memory unit, wherein the configuration parameters include a non-negotiable element in which an assignment of a first client device of the client devices to a particular port of the plurality of ports is carried out regardless of conditions experienced on the local area network, wherein the configuration parameters include a negotiable element in which the assignment of a second client device of the client devices to a certain port of the plurality of ports is renegotiated based on the conditions experienced on the local area network;
   receive, at the command channel, a request from the second client device of the client devices to access the local area network;
   retrieve the port allocation instructions;
   assign, by the wireless access point, one of the plurality of ports to the second client device based on the port allocation instructions, bandwidth utilization, and an identifier of the second client device;
   monitor, by the wireless access point, the bandwidth utilization on the local area network of the second client device;
   when the bandwidth utilization surpasses a threshold bandwidth utilization, move by the wireless access point a connection of the second client device over to an individual port, wherein the application of the wireless access point negotiates with the second client device in order to move the connection to the individual port; and
   when the second client device was previously connected to the individual port and when the bandwidth utilization falls below the threshold bandwidth utilization, move by wireless access point the connection of the second client device to a shared port that is part of a shared pool, wherein the application of the wireless access point negotiates with the second client device in order to move the connection to the shared port;
   wherein the wireless access point enables network access for the client devices and is not one of the client devices.

2. The system of claim 1, wherein the configuration parameters include:
   assignment of at least one of the client devices, via a corresponding identifier of the at least one of the client devices, to a shared port of the plurality of ports.

3. The system of claim 1, wherein the configuration parameters include:
   assignment of at least one of the client devices, via a corresponding identifier of the at least one of the client devices, to a dedicated port of the plurality of ports.

4. The system of claim 1, wherein the command channel operates as a shared port with respect to at least one of the client devices based on a threshold level of bandwidth utilization of the at least one of the client devices.

5. The system of claim 1, wherein the configuration parameters include a maximum threshold bandwidth utilization pattern that is identified from monitoring the local area network over time, and the application is configured to:
   dynamically renegotiate assignment of at least one of the client devices to a dedicated port of the plurality of ports.

6. The system of claim 1, wherein the configuration parameters include a minimum threshold bandwidth utilization pattern that is identified from monitoring the local area network over time, and the application is configured to:
   dynamically renegotiate assignment of the at least one of the client devices to a shared port of the plurality of ports.

7. The system of claim 1, wherein the configuration parameters include a threshold bandwidth utilization value that is identified from monitoring the local area network over time, and the application is configured to:
   renegotiate assignment of at least one of the client devices when bandwidth utilization of the at least one of the client devices is outside of the threshold bandwidth utilization value, wherein reassignment of the at least one of the client devices is implemented based on at least one of:
   immediately on determination that the at least one of the client devices is outside of the threshold utilization value; and
   upon reconnection of the at least one of the client devices to the local area network.

8. A method for operation of a wireless access point, comprising:
   setting, via an input component of the wireless access point, a first port of a plurality of ports as a command channel, the command channel providing a first point of contact between the wireless access point and client devices communicatively supported over a local area network by the wireless access point, wherein the input component is selected from a group consisting of one or more buttons, knobs, and switches;
   receiving, at a computer processor of the wireless access point, configuration parameters from the user, the configuration parameters including port allocation instructions for the plurality of ports and identifiers of the client devices, the port allocation instructions and the identifiers stored in a memory unit, wherein the configuration parameters include a non-negotiable element in which an assignment of a first client device of the client devices to a particular port of the plurality of ports is carried out regardless of conditions experienced on the local area network, wherein the configuration parameters include a negotiable element in which the assignment of a second client device of the client devices to a certain port of the plurality of ports is renegotiated based on the conditions experienced on the local area network;

receiving, at the command channel, a request from the second client device of the client devices to access the local area network;

retrieving the port allocation instructions;

assigning, by the wireless access point, one of the plurality of ports to the second client device based on the port allocation instructions, bandwidth utilization, and an identifier of the second client device;

monitoring, by the wireless access point, the bandwidth utilization on the local area network of the second client device;

when the bandwidth utilization surpasses a threshold bandwidth utilization, moving by the wireless access point a connection of the second client device over to an individual port, wherein the application of the wireless access point negotiates with the second client device in order to move the connection to the individual port; and when the second client device was previously connected to the individual port and when the bandwidth utilization falls below the threshold bandwidth utilization, moving by wireless access point the connection of the second client device to a shared port that is part of a shared pool, wherein the application of the wireless access point negotiates with the second client device in order to move the connection to the shared port;

wherein the wireless access point enables network access for the client devices and is not one of the client devices.

9. The method of claim 8, wherein the configuration parameters include:
assignment of at least one of the client devices, via a corresponding identifier of the at least one of the client devices, to a shared port of the plurality of ports.

10. The method of claim 8, wherein the configuration parameters include:
assignment of at least one of the client devices, via a corresponding identifier of the at least one of the client devices, to a dedicated port of the plurality of ports.

11. The method of claim 8, wherein the command channel operates as a shared port with respect to at least one of the client devices based on a threshold level of bandwidth utilization of the at least one of the client devices.

12. The method of claim 8, wherein the configuration parameters include a maximum threshold bandwidth utilization pattern that is identified from monitoring the local area network over time, and the method comprises:
dynamically renegotiate assignment of at least one of the client devices to a dedicated port of the plurality of ports.

13. The method of claim 8, wherein the configuration parameters include a minimum threshold bandwidth utilization pattern that is identified from monitoring the local area network over time, and the method comprises:
dynamically renegotiate assignment of the at least one of the client devices to a shared port of the plurality of ports.

14. The method of claim 8, wherein the configuration parameters include a threshold bandwidth utilization value that is identified from monitoring the local area network over time, and the method comprises:
renegotiate assignment of at least one of the client devices when bandwidth utilization of the at least one of the client devices is outside of the threshold bandwidth utilization value, wherein reassignment of the at least one of the client devices is implemented based on at least one of:
immediately on determination that the at least one of the client devices is outside of the threshold utilization value; and
upon reconnection of the at least one of the client devices to the local area network.

15. A computer program product comprising a computer readable storage medium having program instructions embodied thereon, the program instructions executable by a computer processor of a wireless access point to cause the computer processor to:
set, via an input component of the wireless access point, a first port of a plurality of ports as a command channel, the command channel providing a first point of contact between the wireless access point and client devices communicatively supported over a local area network by the wireless access point, wherein the input component is selected from a group consisting of one or more buttons, knobs, and switches;

receive, at the wireless access point, configuration parameters from the user, the configuration parameters including port allocation instructions for the plurality of ports and identifiers of the client devices, the port allocation instructions and the identifiers stored in a memory unit, wherein the configuration parameters include a non-negotiable element in which an assignment of a first client device of the client devices to a particular port of the plurality of ports is carried out regardless of conditions experienced on the local area network, wherein the configuration parameters include a negotiable element in which the assignment of a second client device of the client devices to a certain port of the plurality of ports is renegotiated based on the conditions experienced on the local area network;

receive, at the command channel, a request from the second client device of the client devices to access the local area network;

retrieve the port allocation instructions;

assign, by the wireless access point, one of the plurality of ports to the second client device based on the port allocation instructions, bandwidth utilization, and an identifier of the second client device;

monitor, by the wireless access point, the bandwidth utilization on the local area network of the second client device;

when the bandwidth utilization surpasses a threshold bandwidth utilization, move by the wireless access point a connection of the second client device over to an individual port, wherein the application of the wireless access point negotiates with the second client device in order to move the connection to the individual port; and when the second client device was previously connected to the individual port and when the bandwidth utilization falls below the threshold bandwidth utilization, move by wireless access point the connection of the second client device to a shared port that is part of a shared pool, wherein the application of the wireless access point negotiates with the second client device in order to move the connection to the shared port;

wherein the wireless access point enables network access for the client devices and is not one of the client devices.

16. The computer program product of claim 15, wherein the configuration parameters include at least one of:
assignment of at least one of the client devices, via a corresponding identifier of the at least one of the client devices, to a shared port of the plurality of ports; and
assignment of at least one of the client devices, via a corresponding identifier of the at least one of the client devices, to a dedicated port of the plurality of ports.

17. The computer program product of claim 15, wherein the command channel operates as a shared port with respect to at least one of the client devices based on a threshold level of bandwidth utilization of the at least one of the client devices.

18. The computer program product of claim 15, wherein the configuration parameters include a maximum threshold bandwidth utilization pattern that is identified from monitoring the local area network over time, and the program instructions executable by a computer processor further cause the computer processor to:
dynamically renegotiate assignment of at least one of the client devices to a dedicated port of the plurality of ports.

19. The computer program product of claim 15, wherein the configuration parameters include a minimum threshold bandwidth utilization pattern that is identified from monitoring the local area network over time, and the program instructions executable by a computer processor further cause the computer processor to:
dynamically renegotiate assignment of the at least one of the client devices to a shared port of the plurality of ports.

20. The computer program product of claim 15, wherein the configuration parameters include a threshold bandwidth utilization value that is identified from monitoring the local area network over time, and the program instructions executable by a computer processor further cause the computer processor to:
renegotiate assignment of at least one of the client devices when bandwidth utilization of the at least one of the client devices is outside of the threshold bandwidth utilization value, wherein reassignment of the at least one of the client devices is implemented based on at least one of:
immediately on determination that the at least one of the client devices is outside of the threshold utilization value; and
upon reconnection of the at least one of the client devices to the local area network.

\* \* \* \* \*